(12) United States Patent
Dries et al.

(10) Patent No.: US 9,888,827 B2
(45) Date of Patent: Feb. 13, 2018

(54) DISHWASHER APPLIANCE AND A METHOD FOR FORMING A UNITARY TUB

(71) Applicant: General Electric Company, Schenectady, NY (US)

(72) Inventors: John Edward Dries, Louisville, KY (US); Gregory Owen Miller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 254 days.

(21) Appl. No.: 14/681,198

(22) Filed: Apr. 8, 2015

(65) Prior Publication Data
US 2016/0296098 A1    Oct. 13, 2016

(51) Int. Cl.
| *A47L 15/06* | (2006.01) |
| *A47L 15/14* | (2006.01) |
| *B33Y 10/00* | (2015.01) |
| *B33Y 80/00* | (2015.01) |
| *B29L 31/00* | (2006.01) |

(52) U.S. Cl.
CPC ............ *A47L 15/06* (2013.01); *A47L 15/14* (2013.01); *B33Y 10/00* (2014.12); *B33Y 80/00* (2014.12); *B29L 2031/762* (2013.01)

(58) Field of Classification Search
CPC ............ A47L 15/4225; A47L 15/4221; A47L 15/4204; A47L 15/4208; A47L 15/4219
USPC .......... 134/56 D, 111, 25.2, 186, 184, 58 D, 134/104.4, 198, 10, 188, 108, 191, 178, 134/103.1; 415/206, 119, 143, 126, 146, 415/182.1, 203
See application file for complete search history.

(56) References Cited

U.S. PATENT DOCUMENTS

| 4,004,600 A | * | 1/1977 | Corn | .............. A47L 15/4221 134/176 |
| 5,137,424 A | * | 8/1992 | Daniel | .............. B01D 17/0217 415/206 |
| 5,546,969 A | * | 8/1996 | Vilen | .............. A47L 15/4219 134/176 |
| 5,566,696 A | * | 10/1996 | Dries | .............. A47L 15/4202 134/104.1 |
| 5,579,789 A | * | 12/1996 | Spiegel | .............. A47L 15/23 134/104.1 |
| 5,924,433 A | * | 7/1999 | Thies | .............. A47L 15/4246 134/179 |
| 7,270,132 B2 | * | 9/2007 | Inui | .............. A47L 15/4221 134/186 |
| 7,409,962 B2 | | 8/2008 | Welch | |
| 8,592,519 B2 | | 11/2013 | Martinoni | |
| 9,622,640 B2 | * | 4/2017 | Fountain | .............. A47L 15/22 |
| 2004/0173249 A1 | * | 9/2004 | Assmann | .............. A47L 15/4221 134/94.1 |
| 2005/0120533 A1 | * | 6/2005 | Yoon | .............. A47L 15/4225 29/428 |

(Continued)

*Primary Examiner* — David Cormier
*Assistant Examiner* — Thomas Bucci
(74) *Attorney, Agent, or Firm* — Dority & Manning, P.A.

(57) ABSTRACT

A dishwasher appliance with a tub that defines a wash chamber is provided. A bottom wall of the tub defines a volute. An impeller is positioned within the volute of the bottom wall, and a motor mounted to the tub at the bottom wall of the tub. The motor is coupled to the impeller such that the motor selectively rotates the impeller within the volute of the bottom wall. A related method for forming a unitary tub for a dishwasher appliance is also provided.

10 Claims, 5 Drawing Sheets

(56) References Cited

U.S. PATENT DOCUMENTS

| | | | | |
|---|---|---|---|---|
| 2005/0133072 A1* | 6/2005 | Yoon | A47L 15/4204 | 134/58 D |
| 2005/0263174 A1* | 12/2005 | Yoon | A47L 15/4202 | 134/104.1 |
| 2006/0042668 A1* | 3/2006 | Welch | A47L 15/4204 | 134/111 |
| 2006/0054196 A1* | 3/2006 | Yoon | A47L 15/4297 | 134/56 D |
| 2006/0054198 A1* | 3/2006 | Choi | A47L 15/4204 | 134/56 D |
| 2006/0060222 A1* | 3/2006 | Park | A47L 15/4204 | 134/56 D |
| 2007/0119488 A1* | 5/2007 | Kwon | A47L 15/4221 | 134/198 |
| 2007/0261725 A1* | 11/2007 | Choi | A47L 15/4204 | 134/104.2 |
| 2008/0011340 A1* | 1/2008 | Kim | A47L 15/4225 | 134/56 D |
| 2008/0011341 A1* | 1/2008 | Kim | A47L 15/4221 | 134/56 D |
| 2009/0133724 A1* | 5/2009 | Shin | A47L 15/4204 | 134/104.4 |
| 2010/0108110 A1* | 5/2010 | Ryu | A47L 15/23 | 134/184 |
| 2012/0279527 A1* | 11/2012 | Lee | A47L 15/0036 | 134/106 |
| 2014/0130833 A1* | 5/2014 | Ryu | A47L 15/18 | 134/172 |
| 2014/0182625 A1* | 7/2014 | Lee | A47L 15/0047 | 134/18 |
| 2014/0224285 A1* | 8/2014 | Ham | A47L 15/0047 | 134/184 |
| 2014/0352743 A1* | 12/2014 | Fountain | A47L 15/22 | 134/111 |

* cited by examiner

DISHWASHER APPLIANCE AND A METHOD FOR FORMING A UNITARY TUB

FIELD OF THE INVENTION

The present subject matter relates generally to dishwasher appliances and tubs for dishwasher appliances.

BACKGROUND OF THE INVENTION

Dishwasher appliances generally include a tub and spray assemblies. The spray assemblies direct sprays of wash fluid onto articles within the tub during operation of the dishwasher appliance. To supply wash fluid to the spray assemblies, the dishwasher appliances include a pump.

Mounting the pump to the tub poses certain challenges. For example, the pump can extend downwardly from the tub and consume valuable space within a machine compartment below the tub. Also, efficiently directing wash fluid from the pump to the spray assemblies can be difficult. For example, hoses or pipes can extend from a sump of the tub to the spray assemblies. Due to an orientation and/or position of the pump, the hoses or pipes can require several bends, some as much as ninety degrees, to suitably direct wash fluid from the pump to the spray assemblies. Such bends can negatively affect performance of an associated dishwasher appliance by restricting fluid flow through the hoses or pipes.

Accordingly, a dishwasher appliance with features for assisting with mounting a pump to a tub of the dishwasher appliance while reducing a vertical space occupied by the pump below the tub would be useful. In addition, a dishwasher appliance with features for reducing restrictions on wash fluid flow from a pump to a spray assembly of the dishwasher appliance would be useful.

BRIEF DESCRIPTION OF THE INVENTION

The present subject matter provides a dishwasher appliance with a tub that defines a wash chamber. A bottom wall of the tub defines a volute. An impeller is positioned within the volute of the bottom wall, and a motor mounted to the tub at the bottom wall of the tub. The motor is coupled to the impeller such that the motor selectively rotates the impeller within the volute of the bottom wall. A related method for forming a unitary tub for a dishwasher appliance is also provided. Additional aspects and advantages of the invention will be set forth in part in the following description, or may be apparent from the description, or may be learned through practice of the invention.

In a first exemplary embodiment, a dishwasher appliance is provided. The dishwasher appliance includes a tub that defines a wash chamber. The tub has a bottom wall. The bottom wall of the tub is shaped such that the bottom wall of the tub defines an inlet and a volute. The inlet of the bottom wall extends between the wash chamber of the tub and the volute of the bottom wall such that the inlet of the bottom wall is configured for directing wash fluid from the wash chamber of the tub to the volute of the bottom wall. The tub also defines a first outlet conduit and a second outlet conduit. A first spray assembly is positioned within the wash chamber of the tub. The first outlet conduit extends between the volute of the bottom wall and the first spray assembly. A second spray assembly is also positioned within the wash chamber of the tub. The second outlet conduit extends between the volute of the bottom wall and the second spray assembly. An impeller is positioned within the volute of the bottom wall. A motor is mounted to the tub at the bottom wall of the tub. The motor is coupled to the impeller such that the motor selectively rotates the impeller within the volute of the bottom wall.

In a second exemplary embodiment, a method for forming a unitary tub for a dishwasher appliance is provided. The method includes establishing three-dimensional information of the unitary tub, converting the three-dimensional information of the unitary tub from the step of establishing into a plurality of slices with each slice of the plurality of slices defining a respective cross-sectional layer of the unitary tub, and successively forming each cross-sectional layer of the unitary tub with an additive process. After the step of successively forming, the unitary tub is formed such that (1) the unitary tub defines a wash chamber; (2) a bottom wall of the unitary tub defines an inlet and a volute; (3) the inlet of the bottom wall extends between the wash chamber of the unitary tub and the volute of the bottom wall such that the inlet of the bottom wall is configured for directing wash fluid from the wash chamber of the unitary tub to the volute of the bottom wall; and (4) the unitary tub also defines a first outlet conduit and a second outlet conduit that each extend from the volute of the bottom wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
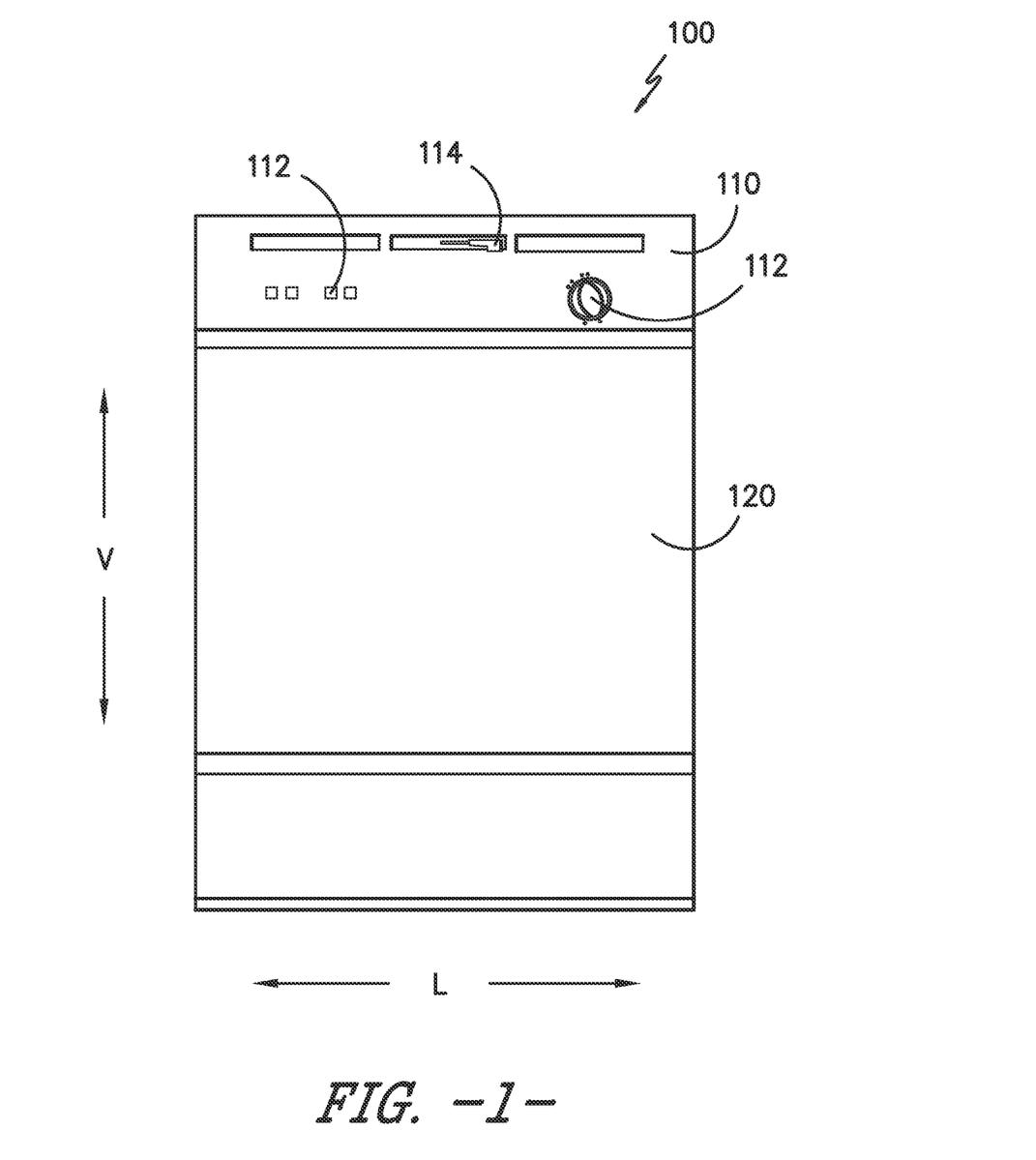
FIG. 1 provides a front elevation view of a dishwasher appliance according to an exemplary embodiment of the present subject matter.
Figure 2:
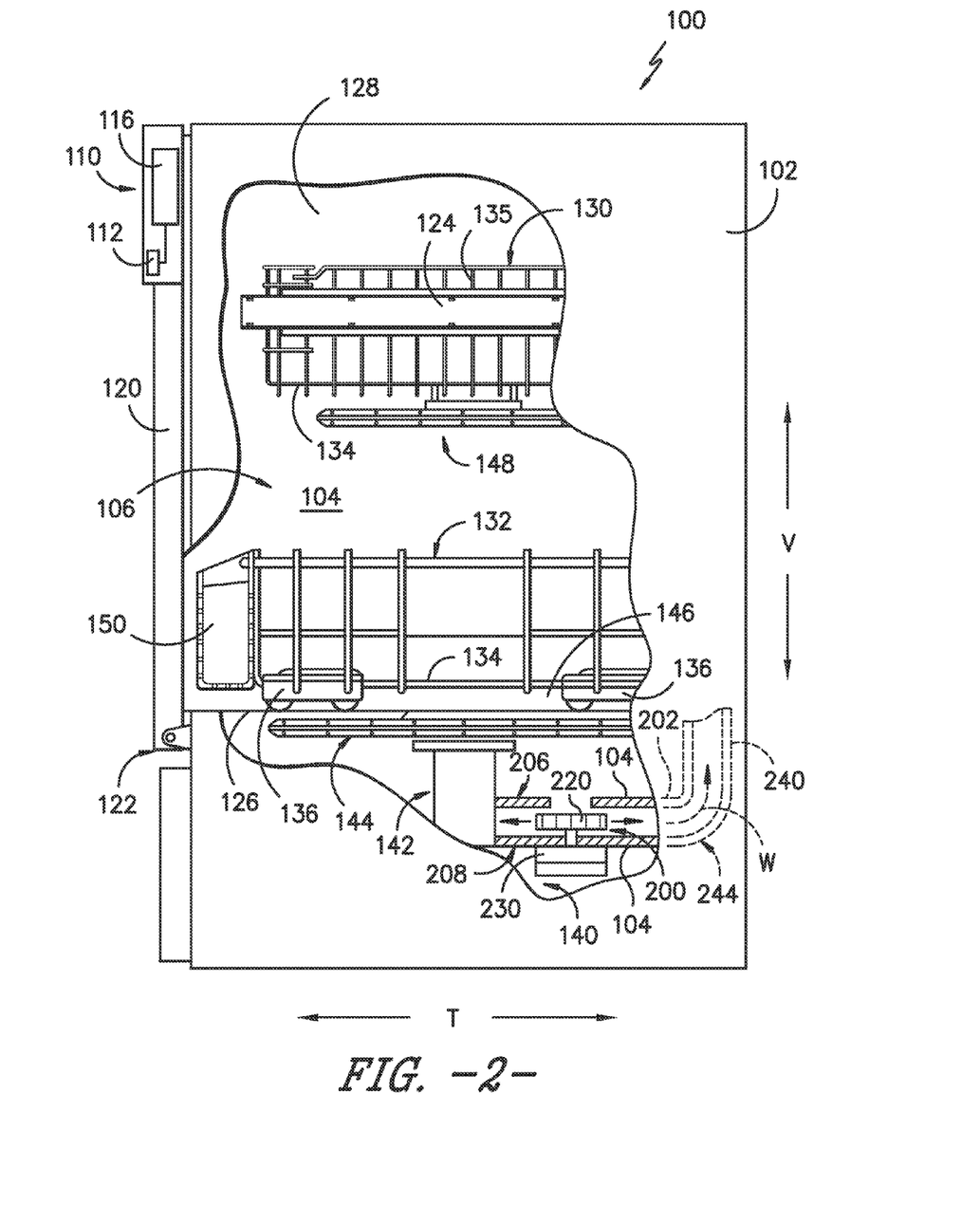
FIG. 2 provides a partial side section view of the exemplary dishwasher appliance of FIG. 1.

FIGS. 1 and 2 depict a dishwasher appliance 100 according to an exemplary embodiment of the present subject matter. Dishwasher appliance 100 defines a vertical direction V, a lateral direction L (FIG. 1) and a transverse direction T (FIG. 2). The vertical, lateral, and transverse directions V, L, and T are mutually perpendicular and form an orthogonal direction system.

Dishwasher appliance 100 includes a chassis or cabinet 102 having a tub 104. Tub 104 defines a wash chamber 106 and includes a front opening (not shown) and a door 120 hinged at its bottom 122 for movement between a normally closed vertical position (shown in FIGS. 1 and 2), wherein wash chamber 106 is sealed shut for washing operation, and a horizontal open position for loading and unloading of articles from dishwasher appliance 100. A latch 114 is used to lock and unlock door 120 for access to chamber 106.

Slide assemblies 124 are mounted on opposing tub sidewalls 128 to support and provide for movement of an upper rack assembly 130. Lower guides 126 are positioned in opposing manner of the sides of chamber 106 and provide a ridge or shelf for roller assemblies 136 so as to support and provide for movement of a lower rack assembly 132. Each of the upper and lower rack assemblies 130 and 132 is fabricated into lattice structures including a plurality of elongated members 134 and 135 that extend in lateral (L), transverse (T), and/or vertical (V) directions. Each rack assembly 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by slide assemblies 124 and roller assemblies 136 that carry the upper and lower rack assemblies 130 and 132, respectively. A silverware basket 150 may be removably attached to the lower rack assembly 132 for placement of silverware, small utensils, and the like, that are too small to be accommodated by the upper and lower rack assemblies 130, 132.

Dishwasher appliance 100 also includes a lower spray assembly 144 that is rotatably mounted within a lower region 146 of the wash chamber 106 and above a tub sump portion 142 so as to rotate in relatively close proximity to lower rack assembly 132. A spray arm or mid-level spray assembly 148 is located in an upper region of the wash chamber 106 and may be located in close proximity to upper rack assembly 130. Additionally, an upper spray assembly (not shown) may be located above the upper rack assembly 130 and mounted to an upper wall of tub 104.

Lower and mid-level spray assemblies 144, 148 and the upper spray assembly are fed by a fluid circulation assembly for circulating water and wash fluid in the tub 104. Portions of the fluid circulation assembly may be located in a machinery compartment 140 located below tub sump portion 142 of tub 104, as generally recognized in the art. Each spray assembly includes an arrangement of discharge ports or orifices for directing washing liquid onto dishes or other articles located in upper and lower rack assemblies 130, 132, respectively. The arrangement of the discharge ports in at least the lower spray assembly 144 provides a rotational force by virtue of washing fluid flowing through the discharge ports. The resultant rotation of lower spray assembly 144 provides coverage of dishes and other articles with a washing spray.

Dishwasher appliance 100 is further equipped with a controller 116 to regulate operation of dishwasher appliance 100. Controller 116 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 116 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 116 may be positioned in a variety of locations throughout dishwasher appliance 100. In the illustrated embodiment, controller 116 may be located within a control panel area 110 of door 120 as shown. In such an embodiment, input/output ("I/O") signals may be routed between the control system and various operational components of dishwasher appliance 100 along wiring harnesses that may be routed through bottom 122 of door 120. Typically, the controller 116 includes a user interface panel 112 through which a user may select various operational features and modes and monitor progress of the dishwasher appliance 100. In one embodiment, user interface panel 112 may represent a general purpose I/O ("GPIO") device or functional block. In one embodiment, the user interface panel 112 may include input components, such as one or more of a variety of electrical, mechanical or electro-mechanical input devices including rotary dials, push buttons, and touch pads. User interface panel 112 may include a display component, such as a digital or analog display device designed to provide operational feedback to a user. User interface panel 112 may be in communication with controller 116 via one or more signal lines or shared communication busses.

It should be appreciated that the present subject matter is not limited to any particular style, model, or configuration of dishwasher appliance. Thus, the exemplary embodiment depicted in FIGS. 1 and 2 is provided for illustrative purposes only. For example, different locations may be provided for a user interface 112, different configurations may be provided for upper and lower rack assemblies 130, 132 and/or lower and mid-level spray assemblies 144, 148, and other differences may be applied as well.

Figure 3:
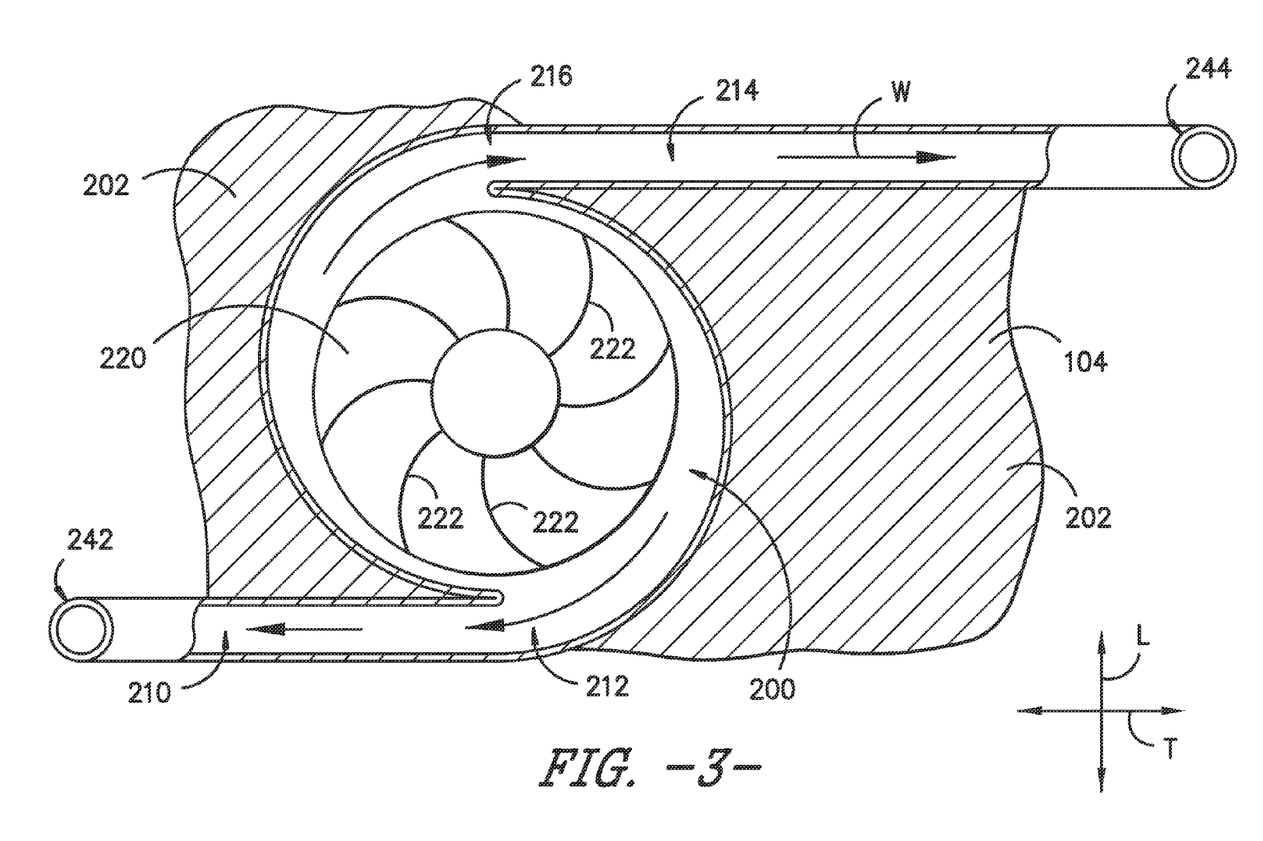
FIG. 3 provides partial top section view of a volute of the exemplary dishwasher appliance of FIG. 1.
Figure 4:
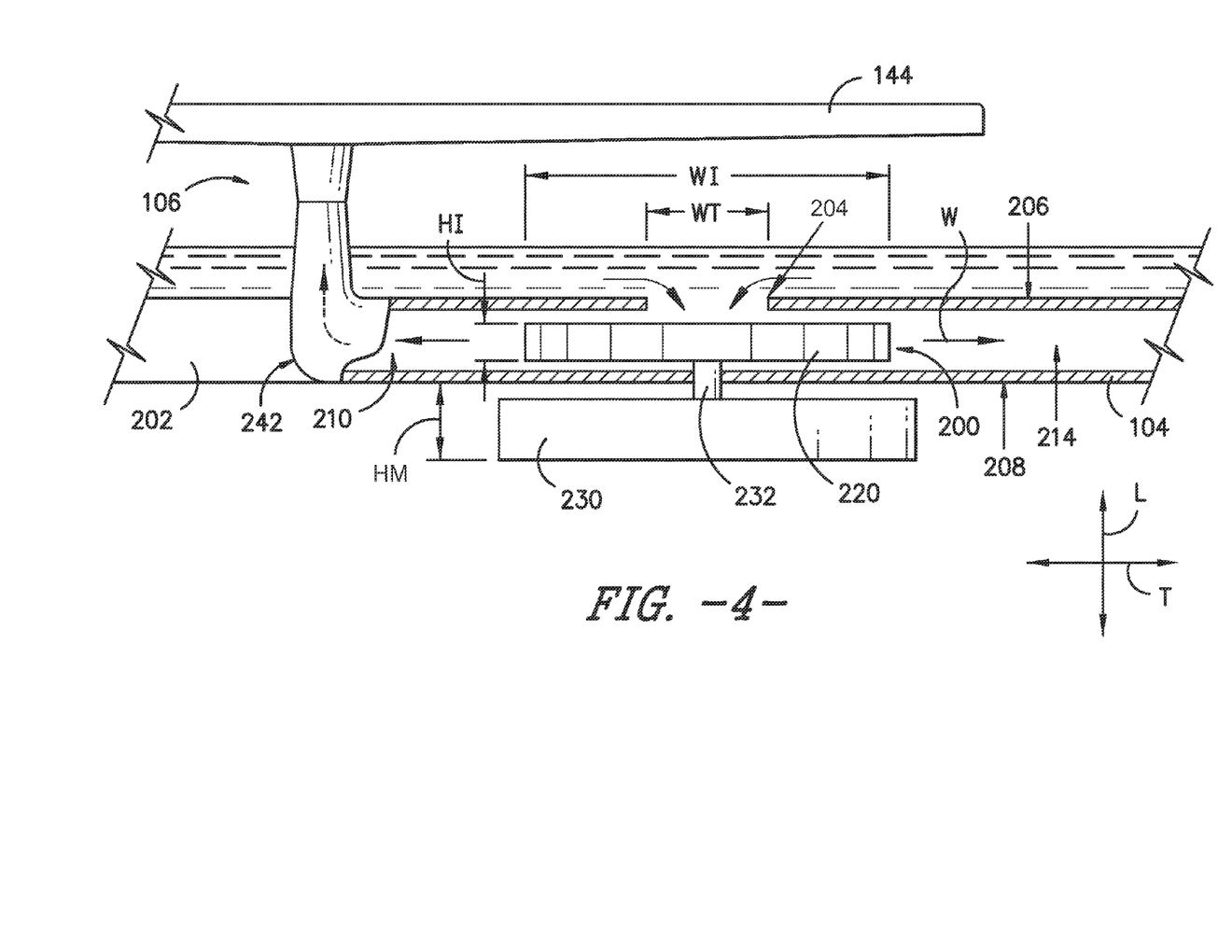
FIG. 4 provides a partial side section view of the volute of the exemplary dishwasher appliance of FIG. 1.

FIG. 3 provides partial top section view of a volute 200 of dishwasher appliance 100. FIG. 4 provides a partial side section view of volute 200 of dishwasher appliance 100. As discussed in greater detail below, tub 104 of dishwasher appliance 100 may be a unitary tub such tub 104 is integrally formed of a continuous material, such as a plastic. Thus, various components of tub 104, including a bottom wall 202 and tub side walls 128 of tub 104, may be integrally formed of a continuous material, e.g., such as a single, continuous piece of plastic.

As may be seen in FIGS. 2, 3 and 4, the fluid circulation assembly of dishwasher appliance 100 includes volute 200, an impeller 220 with blades 222 and a motor 230. Impeller 220 is disposed within volute 200 and is coupled to motor 230. Thus, motor 230 rotates or spins impeller 220 within volute 200 during operation of motor 230. When impeller 220 rotates within volute 200, impeller 220 draws wash fluid from wash chamber 106 into volute 200 and urges such wash fluid out of volute 200 to spray assemblies of dishwasher appliance 100, such as lower spray assembly 144 and/or mid-level spray assembly 148. Volute 200, impeller 220 and motor 230 are discussed in greater detail below.

Tub 104 has a bottom wall 202 that defines volute 200, e.g., such that volute 200 is disposed or positioned within bottom wall 202 of tub 104. Bottom wall 202 of tub 104 also defines an inlet 204. Inlet 204 of bottom wall 202 extends between wash chamber 106 of tub 104 and volute 200 of bottom wall 202, e.g., along the vertical direction V. Thus, inlet 204 of bottom wall 202 is configured for directing wash fluid from wash chamber 106 of tub 104 into volute 200 of bottom wall 202, e.g., during operation of motor 230.

Positioning volute 200 within bottom wall 202 may assist with conserving valuable space within machinery compartment 140. For example, as shown in FIG. 2, motor 230 may extend downwardly along the vertical direction V from bottom wall 202 into machinery compartment 140. In particular, motor 230 may extend downwardly along the vertical direction V by a height HM. The height HM may be any suitable height. For example, when motor 230 is a pancake motor or other similar low profile motor, the height HM of motor 230 may be less than five inches, less than four inches, less than three inches, etc. Thus, mounting motor 230 to bottom wall 202 and positioning volute 200 within bottom wall 202 may assist with reducing the vertical space within machinery compartment 140 occupied by volute 200 and/or motor 230 and wash chamber 106 may be larger relative to current dishwasher designs.

Bottom wall 202 of tub 104 has a top surface 206 and a bottom surface 208. Top and bottom surfaces 206, 208 may be spaced apart from each other along the vertical direction V. Top surface 206 of bottom wall 202 is positioned adjacent and faces wash chamber 106 of tub 104, and bottom surface 208 of bottom wall 202 is positioned opposite top surface 206 of bottom wall 202. Motor 230 may be mounted to tub 104 at bottom surface 208 of bottom wall 202. Volute 200 of bottom wall 202 may be formed within bottom wall 202 such that volute 200 of bottom wall 202 is positioned between top surface 206 of bottom wall 202 and bottom surface 208 of bottom wall 202, e.g., along the vertical direction V. In particular, bottom wall 202 of tub 104 may be integrally formed of a continuous piece of material such that top surface 206 of bottom wall 202 and bottom surface 208 of bottom wall 202 are integrally formed of the continuous piece of material and volute 200 is formed within the continuous piece of material, as shown in FIGS. 2, 3 and 4.

Tub 104, e.g., bottom wall 202 of tub 104, also defines a first outlet conduit 210 and a second outlet conduit 214. First outlet conduit 210 extends from volute 200 towards or to a first spray assembly of dishwasher appliance 100, such as lower spray assembly 144, positioned within wash chamber 106 of tub 104. Second outlet conduit 214 extends from volute 200 towards or to a second spray assembly of dishwasher appliance 100, such as mid-level spray assembly 148, positioned within wash chamber 106 of tub 104. Thus, first and second outlet conduits 210, 214 direct respective flows of wash fluid out of volute 200 during operation of motor 230 when impeller 220 is spinning within volute 200.

As discussed above, impeller 220 is positioned within volute 200 of bottom wall 202, and motor 230 is coupled to impeller 220 such that motor 230 selectively rotates impeller 220 within volute 200. In particular, motor 230 has an axle 232. Impeller 220 is mounted to and/or positioned on axle 232 of motor 230. Axle 232 is positioned and/or oriented such that axle 232 rotates about a vertical axis during operation of motor 230. Thus, impeller 220 may be configured for rotating about the vertical axis within volute 200 during operation of motor 230.

As may be seen in FIG. 3, first outlet conduit 210 has an entrance 212, and second outlet conduit 214 also has an entrance 216. Entrance 212 of first outlet conduit 210 is positioned at volute 200 of bottom wall 202, and entrance 216 of second outlet conduit 214 is also positioned at volute 200 of bottom wall 202. Entrance 212 of first outlet conduit 210 may be positioned opposite entrance 216 of second outlet conduit 214 within volute 200, e.g., such that entrance 212 of first outlet conduit 210 is spaced apart from and positioned at an opposite side of volute 200 from entrance 216 of second outlet conduit 214 within volute 200.

As may be seen in FIGS. 2 and 3, second outlet conduit 214 may also extend straight or linearly, e.g., along transverse direction T, from volute 200 of bottom wall 202 to a back wall 240 of tub 104. Thus, a bend 244 of second outlet conduit 214 may be positioned at or adjacent back wall 240 of tub 104. Bend 244 of second outlet conduit 214 may be about ninety degrees, e.g., such that a flow of wash fluid (shown with arrows W) within second outlet conduit 214 changes direction at bend 244 of second outlet conduit 214 in order to follow back wall 240 of tub 104 up to mid-level spray assembly 148. Second outlet conduit 214 may have no other substantial bend between volute 200 and bend 244, e.g., such that the flow of wash fluid W within second outlet conduit 214 only substantially changes direction at bend 244 of second outlet conduit 214 after exiting volute 200, as shown in FIG. 3. As used herein, the term "substantial bend" means bends where the flow of wash fluid W within second outlet conduit 214 changes direction by at least twenty degrees. Thus, it should be understood that second outlet conduit 214 may include slight bends, such as bends where the flow of wash fluid W within second outlet conduit 214 changes direction by less than twenty degrees. Such shaping of second outlet conduit 214 may assist with reducing restriction to wash fluid flow through second outlet conduit 214 during operation of motor 230.

As may be seen in FIGS. 2 and 3, first outlet conduit 210 may be similarly shaped. Thus, first outlet conduit 210 may extend straight or linearly, e.g., along transverse direction T, from volute 200 of bottom wall 202 to a bend 242 of first outlet conduit 210 that direct wash fluid within first outlet conduit 210 to lower spray assembly 144. Bend 242 of first outlet conduit 210 may be about ninety degrees, e.g., such that wash fluid within first outlet conduit 210 changes direction at bend 242 of first outlet conduit 210 and flows up to lower spray assembly 144. First outlet conduit 210 may have no other substantial bend between volute 200 and bend 242. However, it should be understood that first outlet conduit 210 may include slight bends, such as bends where wash fluid within first outlet conduit 210 changes direction by less than twenty degrees. Such shaping of first outlet conduit 210 may assist with reducing restriction to wash fluid flow through first outlet conduit 210 during operation of motor 230.

As may be seen in FIG. 4, inlet 204 of bottom wall 202 defines a width WT, and impeller 220 also defines a width WI. The width WT of inlet 204 may be less than the width WI of impeller 220, e.g., such that impeller 220 is formed within volute 200 during formation of tub 104. As also may be seen in FIG. 4, impeller 220 defines a height HI, e.g., along the vertical direction V. The height HI of impeller 220 may be less than the width WI of impeller 220. Orienting impeller 220 such that impeller 220 rotates about a substantially vertical axis during operation of motor 230 may assist with further reducing a vertical space occupied by impeller 220, e.g., when the height HI of impeller 220 may be less than the width WI of impeller 220, relative to orienting impeller 220 such that impeller 220 rotates about a substantially horizontal axis during operation of motor 230.

Figure 5:
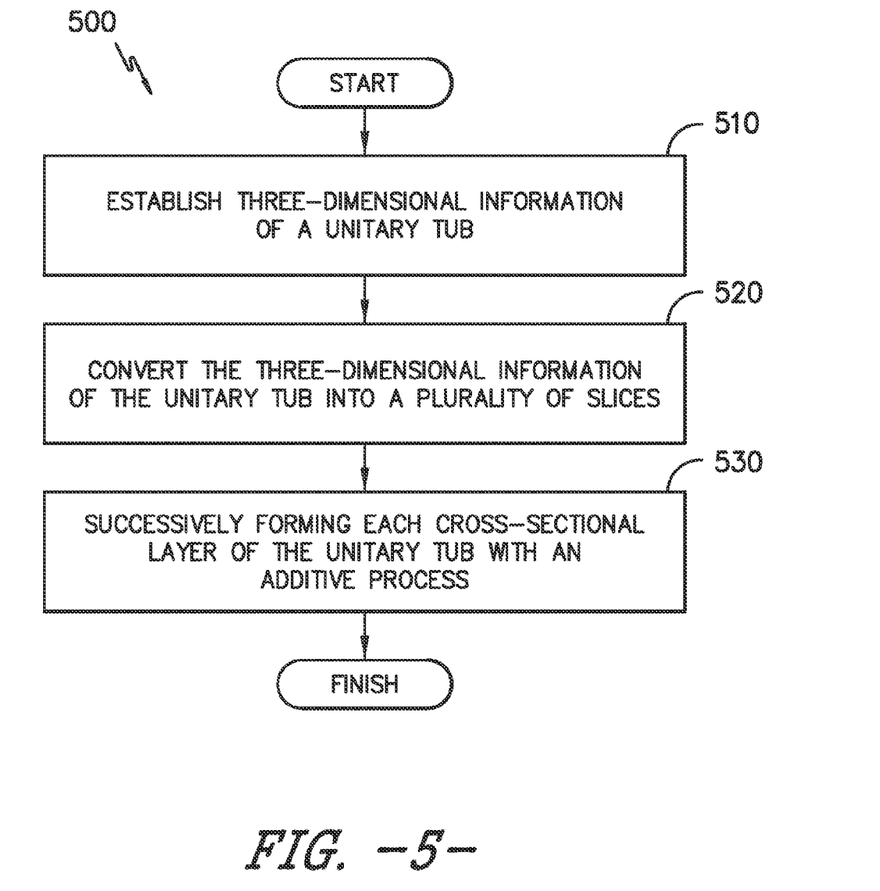
FIG. 5 illustrates a method for forming a unitary tub for a dishwasher appliance according to an exemplary embodiment of the present subject matter.

FIG. 5 illustrates a method 500 for forming a unitary tub for a dishwasher appliance according to an exemplary embodiment of the present subject matter. Method 500 may be used to form any suitable tub. For example, method 500 may be used to form tub 104 (FIG. 2). Method 500 permits formation of various features of tub 104, as discussed in greater detail below. Method 500 includes fabricating tub 104 as a unitary tub, e.g., such that tub 104 is formed of a continuous piece of plastic, metal or other suitable material. More particularly, method 500 includes manufacturing or forming tub 104 using an additive process, such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering and other known processes. An additive process fabricates plastic or metal components using three-dimensional information, for example a three-dimensional computer model, of the component. The three-dimensional information is converted into a plurality of slices, each slice defining a cross section of the component for a predetermined height of the slice. The component is then "built-up" slice by slice, or layer by layer, until finished.

Accordingly, at step 510, three-dimensional information of tub 104 is determined. As an example, a model or prototype of tub 104 may be scanned to determine the three-dimensional information of tub 104 at step 510. As another example, a model of tub 104 may be constructed using a suitable CAD program to determine the three-dimensional information of tub 104 at step 510. At step 520, the three-dimensional information is converted into a plurality of slices that each defines a cross-sectional layer of tub 104. As an example, the three-dimensional information from step 510 may be divided into equal sections or segments, e.g., along a central axis of tub 104 or any other suitable axis. Thus, the three-dimensional information from step 510 may be discretized at step 520, e.g., in order to provide planar cross-sectional layers of tub 104.

After step 520, tub 104 is fabricated using the additive process, or more specifically each layer is successively formed at step 530, e.g., by fusing or polymerizing a plastic using laser energy or heat. The layers may have any suitable size. For example, each layer may have a size between about five ten-thousandths of an inch and about one thousandths of an inch. Tub 104 may be fabricated using any suitable additive manufacturing machine as step 530. For example, any suitable laser sintering machine, inkjet printer or laserjet printer may be used at step 530.

Utilizing method 500, tub 104 may have fewer components and/or joints than known tubs. Specifically, tub 104 may require fewer components because tub 104 may be a single piece of continuous plastic or metal, e.g., rather than multiple pieces of plastic or metal joined or connected together. Also, method 500 may form tub 104 such that volute 200 is integrally formed within tub 104, e.g., within bottom wall 202 of tub 104. Also, tub 104 may be less prone to leaks and/or be stronger when formed with method 500.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance, comprising:
   a tub defining a wash chamber, the tub having a bottom wall, the bottom wall of the tub shaped such that the bottom wall of the tub defines an inlet and a volute, the inlet of the bottom wall extending between the wash chamber of the tub and the volute of the bottom wall such that the inlet of the bottom wall is configured for directing wash fluid from the wash chamber of the tub directly into the volute of the bottom wall, the tub also defining a first outlet conduit and a second outlet conduit;
   a first spray assembly positioned within the wash chamber of the tub, the first outlet conduit extending between the volute of the bottom wall and the first spray assembly;
   a second spray assembly positioned within the wash chamber of the tub, the second outlet conduit extending between the volute of the bottom wall and the second spray assembly;
   an impeller positioned within the volute of the bottom wall; and
   a motor mounted to the tub at the bottom wall of the tub, the motor coupled to the impeller such that the motor selectively rotates the impeller within the volute of the bottom wall.

2. The dishwasher appliance of claim 1, wherein the motor has an axle, the impeller mounted to the axle of the motor, the axle positioned such that the axle rotates about a vertical axis during operation of the motor.

3. The dishwasher appliance of claim 1, wherein the bottom wall of the tub has a top surface and a bottom surface, the top surface of the bottom wall facing the wash chamber of the tub, the bottom surface of the bottom wall positioned opposite the top surface of the bottom wall, the motor mounted to the tub at the bottom surface of the bottom wall.

4. The dishwasher appliance of claim 3, wherein the volute of the bottom wall is positioned between the top surface of the bottom wall and the bottom surface of the bottom wall.

5. The dishwasher appliance of claim 4, wherein the tub is integrally formed of a continuous piece of material such that the top surface of the bottom wall and the bottom surface of the bottom wall are integrally formed of the continuous piece of material.

6. The dishwasher appliance of claim 1, wherein the first outlet conduit has an entrance positioned at the volute of the bottom wall and the second outlet conduit has an entrance positioned at the volute of the bottom wall, the entrance of the first outlet conduit positioned opposite the entrance of the second outlet conduit within the volute of the bottom wall.

7. The dishwasher appliance of claim 1, wherein the second outlet conduit extends linearly from the volute of the bottom wall to a back wall of the tub.

8. The dishwasher appliance of claim 7, wherein the first spray assembly is positioned at a bottom portion of the tub and the second spray assembly is positioned above the first spray assembly within the wash chamber of the tub.

9. The dishwasher appliance of claim 1, wherein the impeller is configured for rotating about a vertical axis within the volute of the bottom wall during operation of the motor.

10. The dishwasher appliance of claim 1, wherein the tub is integrally formed of a single continuous piece of plastic.

* * * * *